(12) United States Patent
Tokumasu et al.

(10) Patent No.: US 9,139,167 B2
(45) Date of Patent: Sep. 22, 2015

(54) WET FRICTION PLATE

(75) Inventors: Jun Tokumasu, Hamamatsu (JP);
Shouhei Tominaga, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 14/113,227

(22) PCT Filed: Apr. 13, 2012

(86) PCT No.: PCT/JP2012/060121
§ 371 (c)(1),
(2), (4) Date: Dec. 24, 2013

(87) PCT Pub. No.: WO2012/147539
PCT Pub. Date: Nov. 1, 2012

(65) Prior Publication Data
US 2014/0110199 A1    Apr. 24, 2014

(30) Foreign Application Priority Data

Apr. 27, 2011 (JP) ................................. 2011-099080

(51) Int. Cl.
| | |
|---|---|
| *F16D 25/064* | (2006.01) |
| *F16D 69/00* | (2006.01) |
| *B60T 1/06* | (2006.01) |
| *F16D 13/64* | (2006.01) |
| *F16D 55/40* | (2006.01) |

(52) U.S. Cl.
CPC ................ *B60T 1/065* (2013.01); *F16D 13/64* (2013.01); *F16D 13/648* (2013.01); *F16D 55/40* (2013.01); *F16D 2069/004* (2013.01)

(58) Field of Classification Search
USPC ............ 188/71.5, 71.6, 264 B, 264 D, 264 E;
192/107 R, 113.36
See application file for complete search history.

(56) References Cited

U.S. PATENT DOCUMENTS

| | | | |
|---|---|---|---|
| 6,293,382 B1 * | 9/2001 | Nishide et al. | ............ 192/107 R |
| 6,499,579 B2 * | 12/2002 | Ono et al. | ................ 192/113.36 |
| 8,157,075 B2 * | 4/2012 | Okamura et al. | ......... 192/107 R |
| 2009/0053475 A1 * | 2/2009 | Higashijima et al. | ......... 428/172 |

FOREIGN PATENT DOCUMENTS

| | | |
|---|---|---|
| JP | 200476896 | 3/2004 |
| JP | 2005265186 | 9/2005 |
| JP | 2006125507 | 5/2006 |
| JP | 200838963 | 2/2008 |
| JP | 200947229 | 3/2009 |

* cited by examiner

*Primary Examiner* — Christopher Schwartz
(74) *Attorney, Agent, or Firm* — Michael Tobias

(57) ABSTRACT

Provided is a wet friction plate which can realize a further reduction of drag torque while suppressing a decrease in the total area of frictional sheets. A clutch friction plate 200 is formed by providing frictional sheets 210 and oil grooves 220 on a flat annular metal core 201. On a side surface of the metal core 201 facing a clutch plate 103, a plurality of small frictional sheets 210 and oil grooves 220 are alternatingly arranged along the circumferential direction of the metal core 201. The frictional sheets 210 are disposed to form frictional-sheet groups 211 each including five frictional sheets 210 disposed successively. Outer and inner peripheral edges 213 and 214 of the frictional sheets 210 of each frictional-sheet group 211 form continuously changing arcuate contours 213*a* and 214*a* such that the distances $L_{213}$ and $L_{214}$ between the outer and inner peripheral edges 213 and 214 and the center of rotation O of the metal core 201 continuously change.

17 Claims, 9 Drawing Sheets

WET FRICTION PLATE

TECHNICAL FIELD

The present invention relates to a wet friction plate used in oil, and more particularly to a wet friction plate suitable for a friction clutch or a brake. The friction clutch is disposed between a prime mover and a driven body rotated by the prime mover, and transfers drive force from the prime mover to the driven body or shuts off the transfer. The brake brakes a rotational motion produced by the prime mover.

BACKGROUND ART

Conventionally, a friction clutch and a brake are provided in a vehicle such as a four-wheel car or a two-wheel vehicle. The friction clutch is a mechanical device which transfers rotational drive force of a prime mover such as an engine to a driven body such as wheels, or shuts off the transfer of the rotational drive force. The brake is a mechanical device which brakes rotational motion against the rotational drive force of the prime mover. In general, such a friction clutch and such a brake include two plates which are disposed in oil to face each other. The two plates are a wet friction plate which is formed by attaching frictional sheets on the surface of a flat annular metal core, and a plain plate which has no frictional sheet. Transfer of the rotational drive force or braking is effected by pressing the wet friction plate and the plain plate against each other.

Such a friction clutch and such a brake are always required to reduce so-called drag torque in order to improve the fuel consumption of a vehicle in which the friction clutch or the brake is installed. Drag torque is torque which is transferred between the wet friction plate and the plain plate separated from each other, due to viscous resistance of the oil present between the two plates, when a difference in rotational speed is present between the two plates. Drag torque is one cause of an increase in the fuel consumption of a vehicle.

Therefore, a clutch friction plate (wet friction plate) which reduces drag torque is proposed as disclosed in, for example, Patent Document 1. The proposed clutch friction plate has small frictional sheets which are arranged in the circumferential direction thereof such that a gap serving as an oil groove is provided between adjacent frictional sheets. The clutch friction plate also has cutout spaces which are wider than the oil groove and which are provided at intervals in the row of the frictional sheets. Thus, the clutch friction plate has an enhanced performance of draining clutch oil, to thereby reduce drag torque. In the case of the clutch friction plate disclosed in Patent Document 1, whereas the reduction ratio of the total area of the frictional sheets is 16.6%, the reduction ratio of drag torque is 24.2%.

PRIOR ART DOCUMENTS

Patent Documents

Patent Document 1: Japanese Patent Application Laid-Open (kokai) No. 2008-38963

However, in the case of a wet-type friction clutch or brake in which oil is present between a wet friction plate and a plain plate, reducing the drag torque produced between the wet friction plate and the plain plate is always needed, and the above-described prior art does not satisfy this need. In general, it is known that the drag torque of a friction clutch or a brake changes depending on the total area of the frictional sheets provided on the wet friction plate. Namely, the drag torque decreases with the total area of the frictional sheets provided on the wet friction plate. However, when the total area of the frictional sheets is decreased, the performance of the friction clutch of transmitting rotational drive force or the braking performance of the brake deteriorates. Therefore, it is not practical to merely decrease the total area of the frictional sheets.

The present invention was accomplished in order to solve the above-described problem, and its object is to provide a wet friction plate which can realize a further reduction of drag torque while suppressing a decrease in the total area of frictional sheets.

SUMMARY OF THE INVENTION

In order to achieve the above-described object, the present invention provides a wet friction plate recited in claim 1 which comprises a metal core having a flat annular shape, and a plurality of frictional sheets disposed on a surface of the metal core along a circumferential direction thereof such that a gap is provided between adjacent frictional sheets so as to form an oil groove, the wet friction plate being characterized in that at least one peripheral edge of outer and inner peripheral edges of each frictional sheet as viewed in radial direction of the metal core forms a continuously changing contour such that a distance between the at least one peripheral edge and a center of rotation of the metal core continuously changes over a single frictional-sheet group including at least two frictional sheets located adjacent to each other.

According to the feature of the present invention recited in claim 1, at least one of the outer peripheral edge and inner peripheral edge of each frictional sheet forms a continuously changing contour such that the distance between the at least one peripheral edge and the center of rotation of the metal core changes continuously at least over a region corresponding to two frictional sheets. The present inventors found by performing an experiment that it is possible to further reduce drag torque while suppressing a decrease in the area of the frictional sheets compared with the prior art. Although the reason why such an advantageous effect is obtained is not clear, a conceivable mechanism is as follows. An outer peripheral edge portion and/or inner peripheral edge portion of an annular oil film formed in an annular displacement region within which the frictional sheets rotate as a result of rotation of the wet friction plate is disturbed by the continuously changing contour formed along the outer peripheral edges and/or inner peripheral edges of the frictional sheets. As a result, it becomes difficult for the oil to maintain the continuous annular oil film, and the oil film breaks in some regions.

Another feature of the present invention recited in claim 2 resides in that the continuously changing contour formed by the frictional sheets has an arcuate shape.

According to the feature of the present invention recited in claim 2, the continuously changing contour formed by the frictional sheets has an arcuate shape. Therefore, a decrease in the area of the frictional sheets can be suppressed compared with the case where the continuously changing contour has a straight shape.

Another feature of the present invention recited in claim 3 resides in that the continuously changing contour is formed along each of the outer and inner peripheral edges of each frictional sheet.

According to the feature of the present invention recited in claim 3, the continuously changing contour is formed along each of the outer and inner peripheral edges of each frictional sheet. Therefore, the oil film can be broken more effectively.

Another feature of the present invention recited in claim 4 resides in that at least two frictional-sheet groups are provided to be located adjacent to each other; and mutually facing two end portions of two adjacent frictional sheets, which respectively belong to two adjacently located frictional-sheet groups, have a radial positional difference therebetween at least at the outer peripheral edge or at the inner peripheral edge.

According to the feature of the present invention recited in claim 4, at a boundary between the adjacently located frictional-sheet groups, a positional difference in the radial direction of the metal core is provided between end portions of the outer peripheral edges and/or between end portions of the inner peripheral edges. As a result, the outer peripheral edge portion and/or inner peripheral edge portion of an annular oil film formed in an annular displacement region within which the frictional sheets rotate as a result of rotation of the wet friction plate is disturbed by the edge portions having a positional difference in the radial direction therebetween, which triggers breakage of the oil film.

Another feature of the present invention recited in claim 5 resides in that at least two frictional-sheet groups are provided to be located adjacent to each other; and the oil groove has a generally triangular shape defined by mutually facing two edge portions of two adjacent frictional sheets, which respectively belong to the two adjacently located frictional-sheet groups, such that a distance between the two edge portions decreases or increases from the inner periphery side toward the outer periphery side of the metal core.

According to the feature of the present invention recited in claim 5, the oil grooves each provided between adjacent frictional-sheet groups have a generally triangular shape such that the width of the oil grooves increases from the inner peripheral side toward the outer peripheral side of the metal core. Since the flow of oil from the inner side toward the outer side of the rotating wet friction plate is promoted, it is possible to prevent the formation of a continuous annular oil film in the region within which the frictional sheets rotate.

MODES FOR CARRYING OUT THE INVENTION

Figure 1:
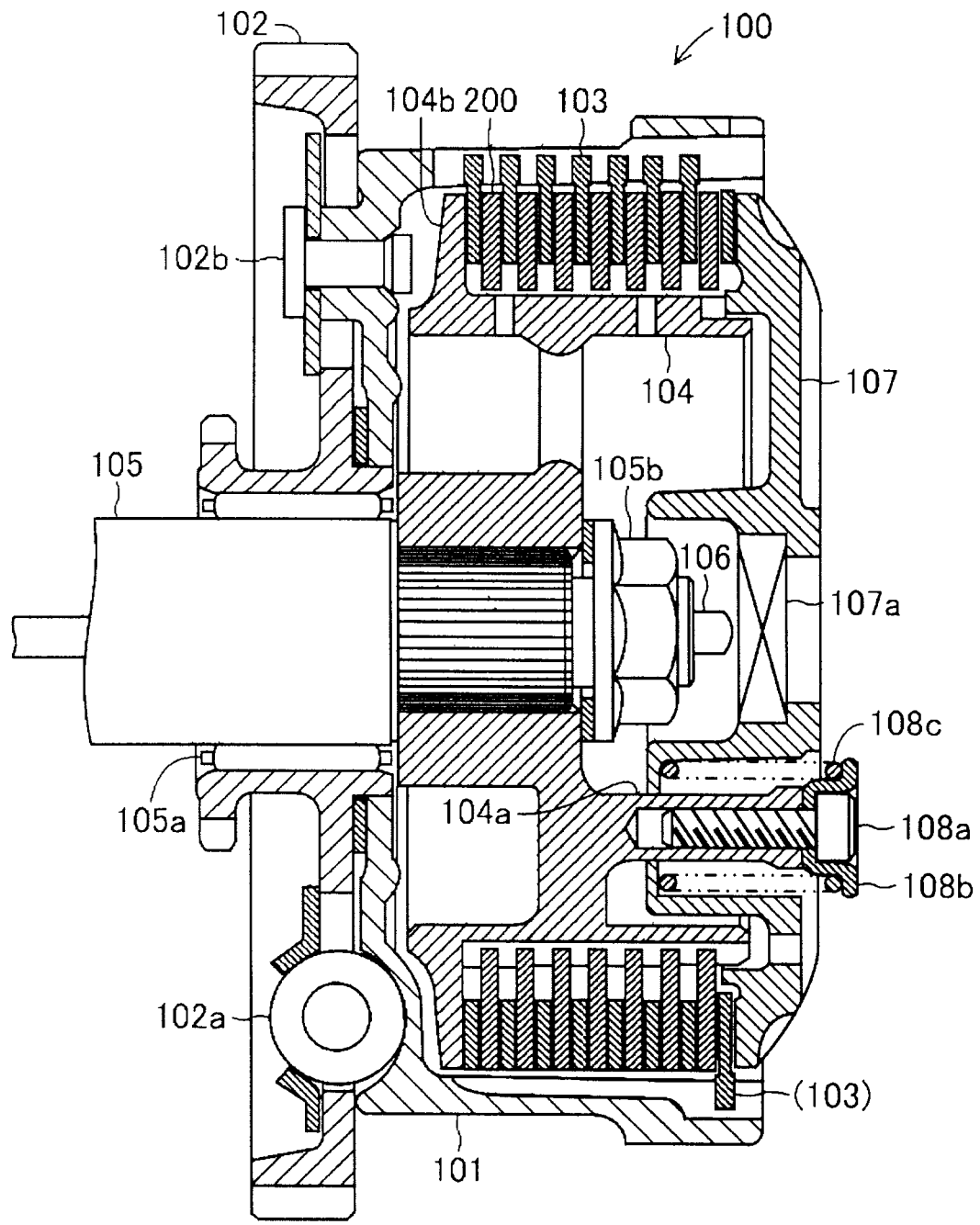
FIG. 1 is a sectional view showing the overall structure of a friction clutch which includes a clutch friction plate (wet friction plate) according to one embodiment of the present invention.

One embodiment of a wet friction plate according to the present invention will now be described with reference to the drawings. FIG. 1 is a sectional view showing the overall structure of a friction clutch 100 which includes a clutch friction plate 200 which is a wet friction plate according to one embodiment of the present invention. In each of the drawings which will be referred to herein, some components are shown schematically, such as in an exaggerated manner so as to facilitate the understanding of the present invention. Therefore, the dimensions, dimensional ratios, etc. of the constituent elements may differ from the actual dimensions, dimensional ratios, etc. The friction clutch 100 is a mechanical device for transferring drive torque from an engine (not shown), which is the prime mover of a two-wheel vehicle (motorcycle), to a wheel (not shown), which is a driven body, and stopping the transfer of the drive torque. The friction clutch 100 is disposed between the engine and a transmission (not shown).

(Structure of Clutch Friction Plates 200)

The friction clutch 100 has a housing 101 formed of an aluminum alloy. The housing 101 is a member which is formed into the shape of a cylindrical tube with a bottom and which partially constitutes the enclosure of the friction clutch 100. An input gear 102 is fixed, through a torque damper 102a, to the left-hand side surface of the housing 101 as viewed in FIG. 1 by means of rivets 102b. The input gear 102 is in engagement with an unillustrated drive gear which is driven and rotated by an engine. Thus, the input gear 102 is driven and rotated by the drive gear. A plurality (8 in the present embodiment) of clutch plates 103 are held on the inner circumferential surface of the housing 101 through spline engagement so that the clutch plates 103 can move in the axial direction of the housing 101 and can rotate together with the housing 101.

The clutch plates 103 are flat annular components which are pressed against clutch friction plates 200, which will be described later. The clutch plates 103 are formed by punching a thin SPCC (cold-rolled steel plate) into an annular shape. Unillustrated oil grooves having a depth of several μm to several tens of μm are formed on opposite side surfaces (the front and back surfaces) of each clutch plate 103 so as to retain clutch oil, which will be described later. Surface hardening treatment is performed on the opposite side surfaces (the front and back surfaces) of each clutch plate 103 on which the oil grooves are formed in order to enhance wear resistance. Since this surface hardening treatment does not directly relate to the present invention, it will not be described here.

A friction plate holder 104 having a generally cylindrical shape is disposed inside the housing 101 concentrically with the housing 101. A large number of spline grooves extending in the axial direction of the friction plate holder 104 are formed on the inner circumferential surface of the friction plate holder 104. A shaft 105 is spline-engaged with the spline grooves. One end portion (the right end portion in FIG. 1) of the shaft 105, which is hollow at the center, rotatably supports the input gear 102 and the housing 101 through a needle bearing 105a, and fixedly supports, through a nut 105b, the friction plate holder 104 which is spline-engaged with that end portion. Thus, the friction plate holder 104 rotates together with the shaft 105. The opposite end portion (the left end portion in FIG. 1) of the shaft 105 is connected to the unillustrated transmission of the two-wheel vehicle.

A push rod 106 extends through the hollow space of the shaft 105 and projects from one end (the right end in FIG. 1) of the shaft 105. The end (the left end in FIG. 1) of the push rod 106 opposite the end portion thereof projecting from the one end portion (the right end portion in FIG. 1) of the shaft 105 is connected to an unillustrated clutch operating lever of the two-wheel vehicle. Therefore, when the clutch operating lever is operated, the push rod 106 slides within the hollow space of the shaft 105 in the axial direction of the shaft 105.

A plurality (7 in the present embodiment) of clutch friction plates 200 are held on the outer circumferential surface of the friction plate holder 104 by spline engagement such that the clutch friction plates 200 and the clutch plates 103 are alternatingly arranged, and such that the clutch friction plates 200 can move in the axial direction of the friction plate holder 104 and can rotate together with the friction plate holder 104. The clutch friction plates 200 correspond to the wet friction plate of the present invention. The clutch plates 103 correspond to the plain plate according to the above-mentioned prior art.

Figure 2:
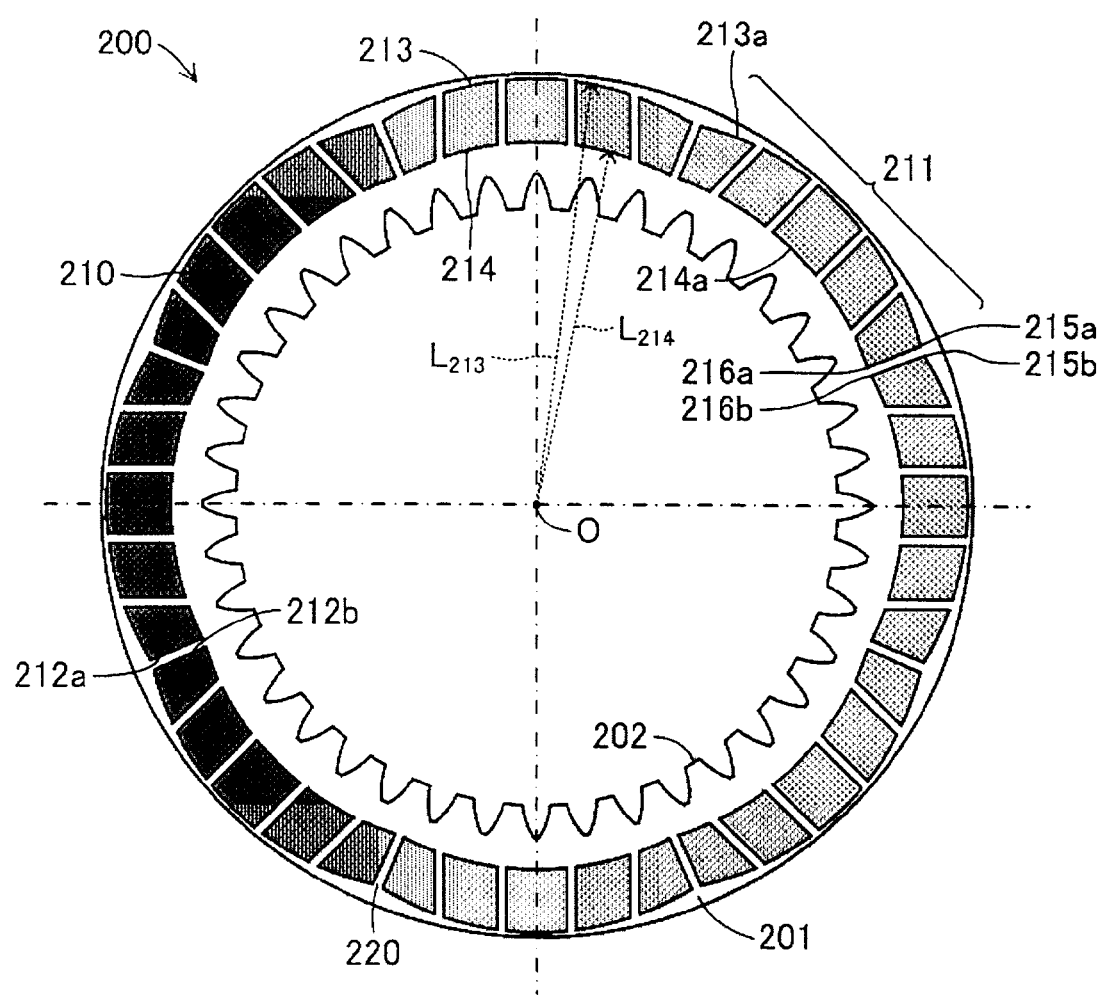
FIG. 2 is a plan view schematically showing the exterior of the clutch friction plate (wet friction plate) according to the embodiment of the present invention which is incorporated in the friction clutch shown in FIG. 1.

As specifically shown in FIG. 2, each clutch friction plate 200 has frictional sheets 210 and oil grooves 220 provided on a flat annular metal core 201. The metal core 201 is a member which serves as the base of the clutch friction plate 200, and it is formed by punching a thin SPCC (cold-rolled steel plate) into a generally annular shape. The clutch friction plate 200 has a plurality of (40 in the present embodiment) small frictional sheets 210 provided on a side surface thereof which faces the clutch plate 103, i.e., a side surface of the metal core 201 which faces the clutch plate 103. The frictional sheets 210 are arranged along the circumferential direction of the metal core 201 such that a gap is formed between adjacent frictional sheets 210. In FIG. 2, the frictional sheets 210 are hatched so as to clearly show them (this applies to other drawings as well).

The frictional sheets 210, which produce an increased frictional force in cooperation with the corresponding clutch plate 103, are formed by cutting a sheet of paper having a large frictional resistance into generally rectangular small sheets each having four sides and four corners. In the present embodiment, the length of each frictional sheet 210 measured in the radial direction of the metal core 201 is smaller than the width of an annular portion of the metal core 201 measured in the radial direction. The frictional sheets 210 are disposed on the metal core 201 such that they form friction sheet groups 211 each including five frictional sheets 210 which are successively arranged.

Specifically, the five frictional sheets 210 of each friction sheet group 211 are formed and disposed such that adjacent edge portions 212a and 212b which face each other are parallel to each other and such that a predetermined gap is formed between the adjacent edge portions 212a and 212b. The outer peripheral edges 213 of the five frictional sheets 210 of each friction sheet group 211 are formed to have a continuously changing arcuate contour 213a such that the distance $L_{213}$ between the contour 213a and the center of rotation O of the metal core 201 changes continuously. The inner peripheral edges 214 of the five frictional sheets 210 of each friction sheet group 211 are formed to have a continuously changing arcuate contour 214a such that the distance $L_{214}$ between the contour 214a and the center of rotation O of the metal core 201 changes continuously. The continuously changing arcuate contours 213a of the outer peripheral edges 213 of the frictional sheets 210 have a common center and the same radius sufficiently smaller than the radius of the metal core 201. Similarly, the continuously changing arcuate contours 214a of the inner peripheral edges 214 of the frictional sheets 210 have the same common center and the same radius sufficiently smaller than the radius of the metal core 201. The present inventors found by performing an experiment that each of the continuously changing arcuate contours 213a and 214a is preferably formed by an arc having a radius equal to or less than about ¾ of the radius of the metal core 201.

The friction sheet groups 211 are arranged along the circumferential direction of the metal core 201 such that a gap equal in size to the gap between adjacent frictional sheets 210 is formed between adjacent friction sheet groups 211. In the present embodiment, the number of the friction sheet groups 211 is eight. The frictional sheets 210 are bonded onto the metal core 201 by adhesive. The frictional sheets 210 may be formed of a material other than paper, such as cork, rubber, or glass, as long as the selected material can increase the frictional force between the clutch friction plates 200 and the clutch plates 103.

The gap between adjacent frictional sheets 210 disposed on the metal core 201 is sufficiently smaller than the width of the frictional sheets 210 in the circumferential direction of the metal core 201, and forms an oil grove 220. The oil groove 220 serves as a flow channel for introducing clutch oil toward the radially inner and outer sides of the clutch friction plate 200, and serves as an oil retaining space for retaining the clutch oil between the clutch friction plate 220 and the clutch plate 103 located adjacent thereto. The metal core 201 has a spline 202 (internal teeth) which is formed along the inner circumference thereof for spline engagement with the friction plate holder 104.

A predetermined amount of clutch oil (not shown) is charged into the interior of the friction plate holder 104, where three tubular support columns 104a are formed (FIG. 1 shows one of them). The clutch oil is supplied to the spaces between the clutch friction plates 200 and the clutch plates 103 so as to absorb frictional heat generated between the clutch friction plates 200 and the clutch plates 103 and prevent wear of the frictional sheets 210. Thus, this friction clutch 100 is a so-called a wet-type multi-plate friction clutch.

The three tubular support columns 104a project from the friction plate holder 104 to the outside in the axial direction of the friction plate holder 104 (the right-hand side in FIG. 1). A pressing force-applying cover 107, which is disposed concentrically with the friction plate holder 104, is fixed to the tubular support columns 104a via bolts 108a, support plates 108b, and coil springs 108c. The pressing force-applying cover 107 assumes the form of a generally circular disc having an outer diameter approximately equal to that of the clutch friction plates 200. The coil springs 108c press the pressing force-applying cover 107 toward the friction plate holder 104. A release bearing 107a which faces the distal end of the push rod 106 located on the right-hand side in FIG. 1 is provided at the center of the pressing force-applying cover 107.

(Operation of Clutch Friction Plates 200)

Next, operation of the cutch friction plates 200 having the above-described structure will be described. As described above, the cutch friction plates 200 are assembled into the friction clutch 100. As described above, the friction clutch 100 is disposed between the engine and the transmission of a vehicle. In accordance with operation of the clutch operating lever by an operator of the vehicle, the clutch transfers drive force from the engine to the transmission or stops the transfer.

When the operator of the vehicle retracts the push rod 106 (moves the push rod 106 to the left in FIG. 1) by operating the clutch lever (not shown), the distal end of the push rod 106 is disengaged from the release bearing 107a. As a result, by virtue of the elastic force of the coil springs 108c, the pressing force-applying cover 107 presses the clutch plates 103. Thus, the clutch plates 103 and the clutch friction plates 200 are pressed against one another while moving toward a support flange 104b formed on the outer circumferential surface of the friction plate holder 104, whereby the clutch plates 103 and the clutch friction plates 200 are frictionally coupled together. As a result, the drive force transmitted from the engine to the input gear 102 is transferred to the transmission via the clutch plates 103, the clutch friction plates 200, the friction plate holder 104, and the shaft 105.

When the operator of the vehicle advances the push rod 106 (moves the push rod 106 to the right in FIG. 1) by operating the clutch lever (not shown), the distal end of the push rod 106 pushes the release bearing 107a. As a result, the pressing force-applying cover 107 moves rightward in FIG. 1 against the elastic force of the coil springs 108c, i.e., it moves away from the clutch plate 103. Thus, the clutch plates 103 and the clutch friction plates 200 are released from a state in which they are pressed and coupled together while moving toward the pressing force-applying cover 107, whereby the clutch plates 103 and the clutch friction plates 200 are disengaged from one another. Consequently, the transfer of drive force from the clutch plates 103 to the clutch friction plates 200 is stopped, whereby the drive force transmitted from the engine to the input gear 102 is prevented from being transferred to the transmission.

In a state in which the clutch plates 103 and the clutch friction plates 200 are disengaged, the direct frictional contact between the clutch plates 103 and the clutch friction plates 200 is cancelled, and the clutch plates 103 and the clutch friction plates 200 are connected indirectly by the clutch oil present therebetween. More specifically, since the clutch oil which is in contact with mainly the frictional sheets 210 of each clutch friction plate 200 is dragged by the frictional sheets 210 because of the viscous resistance thereof, the clutch plate 103 which is in contact with the dragged clutch oil is dragged by the viscous resistance of the clutch oil, whereby the rotational speed thereof decreases.

In this case, it is considered that the clutch oil present between a clutch plate 103 and a clutch friction plate 200 located adjacent thereto forms an oil film having an annular shape corresponding to the shape of an annular displacement region within which mainly the frictional sheets 210 rotate. In the present embodiments, the outer and inner peripheral edges 213 and 214 of the frictional sheets 210 form the continuously changing contours 213a and 214a, respectively, such that arcuate unevenness is repeated for every five frictional sheets 210, i.e., for each friction sheet group 211, over the entire circumference. Therefore, conceivably, outer and inner peripheral edge portions of the continuous annular oil film present between the clutch plate 103 and the clutch friction plate 200 are disturbed by the uneven shapes of the outer and inner peripheral edges 213 and 214 of the frictional sheets 210. As a result, it becomes difficult for the clutch oil to maintain the continuous annular oil film, and the oil film decreases in thickness or breaks in some regions.

Thus, there is created a state in which the clutch oil is not present between the clutch plate 103 and the clutch friction plate 200 in some regions, whereby the transfer of torque between the clutch plate 103 and the clutch friction plate 200 decreases. As a result, the degree of indirect frictional contact between the clutch plate 103 and the clutch friction plate 200 via the clutch oil decreases, whereby the transferred torque, i.e., drag torque decreases.

Figure 3:
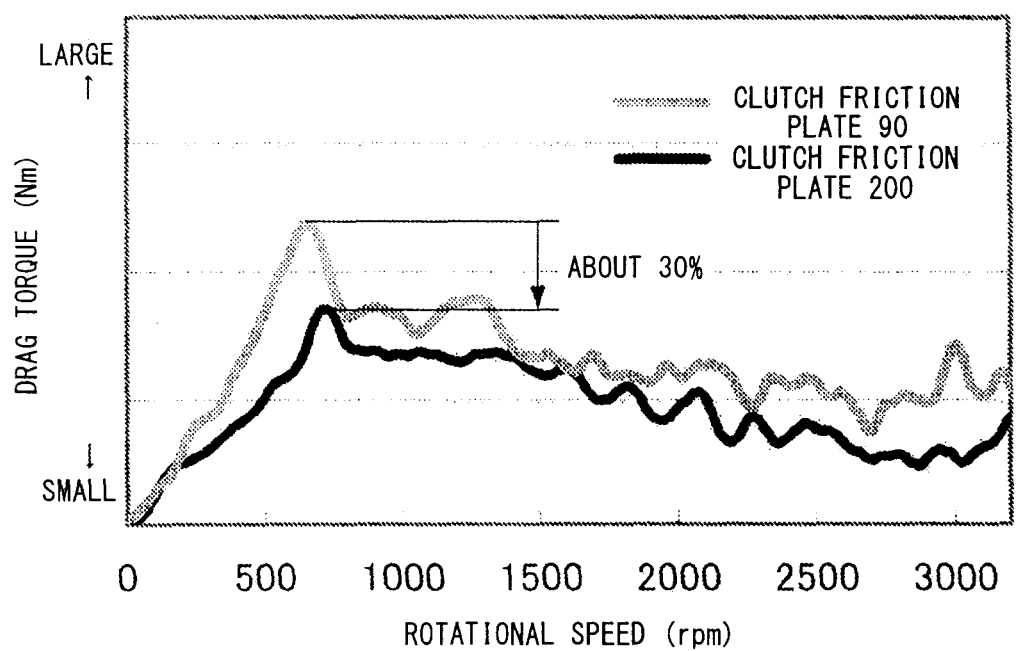
FIG. 3 is a graph showing the result of comparison between a drag torque produced by the clutch friction plate of the present invention shown in FIG. 1 and that produced by a conventional clutch friction plate, which comparison was performed to find the relation between drag torque and the shape of frictional sheets of the present invention.

The results of an experiment performed by the present inventors will now be described. FIG. 3 is a graph which shows the peak value of drag torque generated in an unillustrated friction clutch which employs a conventional clutch friction plate 90 shown in FIG. 9 and the peak value of drag torque generated in the friction clutch 100 which employs the clutch friction plate 200 according to the present invention. In FIG. 3, no torque value is indicated along the vertical axis, because the actual torque values are not required for proving the superiority of the present invention.

Figure 9:
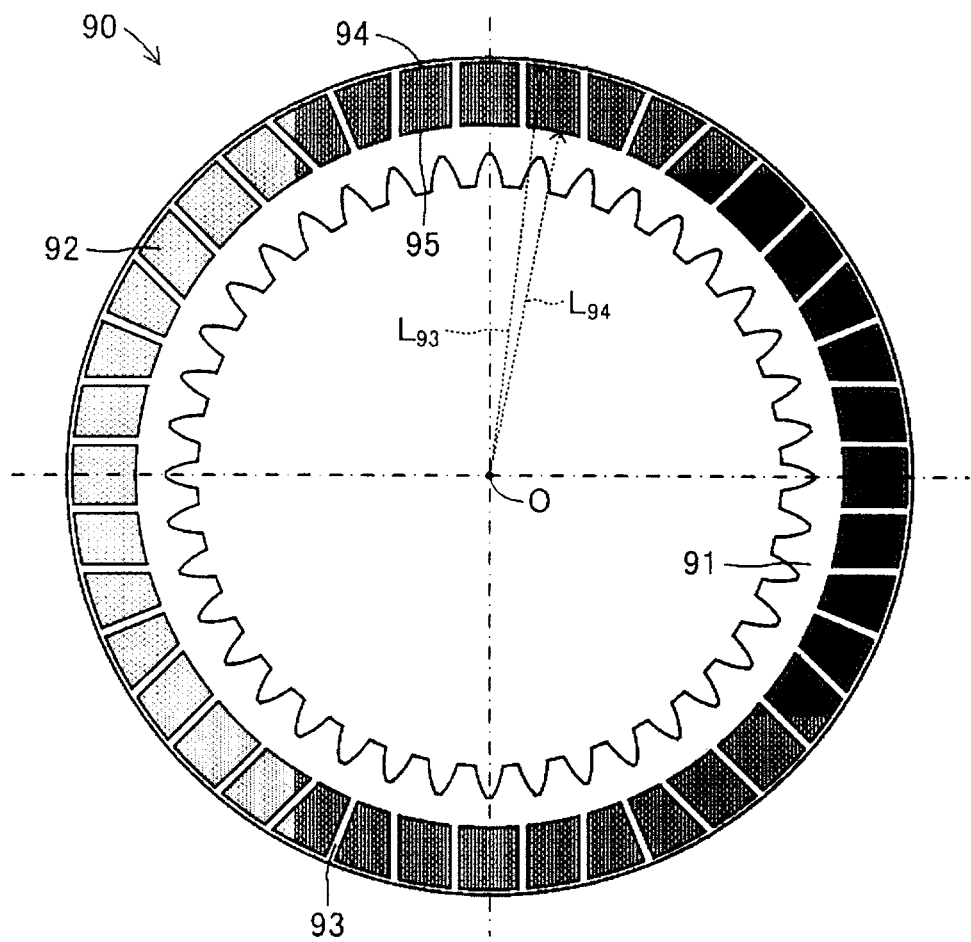
FIG. 9 is a plan view schematically showing the exterior of a conventional clutch friction plate.

As shown in FIG. 9, the conventional clutch friction plate 90 used in the present experiment is configured such that small frictional sheets 92 are bonded to a metal core 91 along the circumferential direction thereof such that an oil groove 93 is formed between adjacent frictional sheets 92, and the distances $L_{94}$ and $L_{95}$ between the outer and inner peripheral edges 94 and 95 of each frictional sheet 92 and the center of rotation O of the metal core 91 are constant over the entire circumference. Namely, in the case of the clutch friction plate 90, the outer and inner peripheral edges 94 and 95 of each frictional sheet 92 are formed by arcs which are concentric with the metal core 91 and have different radiuses. The total area of the frictional sheets 92 of the clutch friction plate 90 is 1375 $mm^2$, and the total area of the frictional sheets 210 of the clutch friction plate 200 is 1268 $mm^2$. Namely, the reduction ratio of the total area of the frictional sheets 210 of the clutch friction plate 200 to that of the frictional sheets 92 of the clutch friction plate 90 is about 7.8%. The conventional friction clutch is identical in structure with the friction clutch 100 according to the present invention except for the clutch friction plate 200.

As is clear from the results of the experiment shown in FIG. 3, the friction clutch 100 in which the clutch friction plate 200 of the present invention is used reduces its drag torque by about 30% compared to the friction clutch in which the conventional clutch friction plate 90 is used. Namely, in the case of the clutch friction plate 200 of the present invention, drag torque is reduced by about 30% although the reduction ratio of the area of the frictional sheets 210 is only about 7.8%. Therefore, the clutch friction plate 200 of the present invention realizes a considerably large reduction of drag torque while decreasing the area reduction ratio compared with the conventional clutch friction plate 90.

As can be understood from the description of operation, in the clutch friction plate 200 of the above-described embodiment, the outer and inner peripheral edges 213 and 214 of each frictional sheet 210 are formed to have continuously changing arcuate contours 213a and 214a such that the distances $L_{213}$ and $L_{214}$ between the outer and inner peripheral edges 213 and 214 and the center of rotation O of the metal core 201 change continuously over a range corresponding to five frictional sheets 210. Thus, through the experiment performed by the inventors, it was confirmed that it is possible to further reduce drag torque while suppressing a reduction in the area of the frictional sheets 210 compared with the prior art.

The present invention is not limited to the above-described embodiment, and it may be modified in various ways without departing from the scope of the present invention. In modifications described below, structural portions identical with those of the clutch friction plate 200 according to the above-described embodiment are denoted by the same reference numerals as those used for clutch friction plate 200, and their descriptions will not be repeated.

Figure 4:
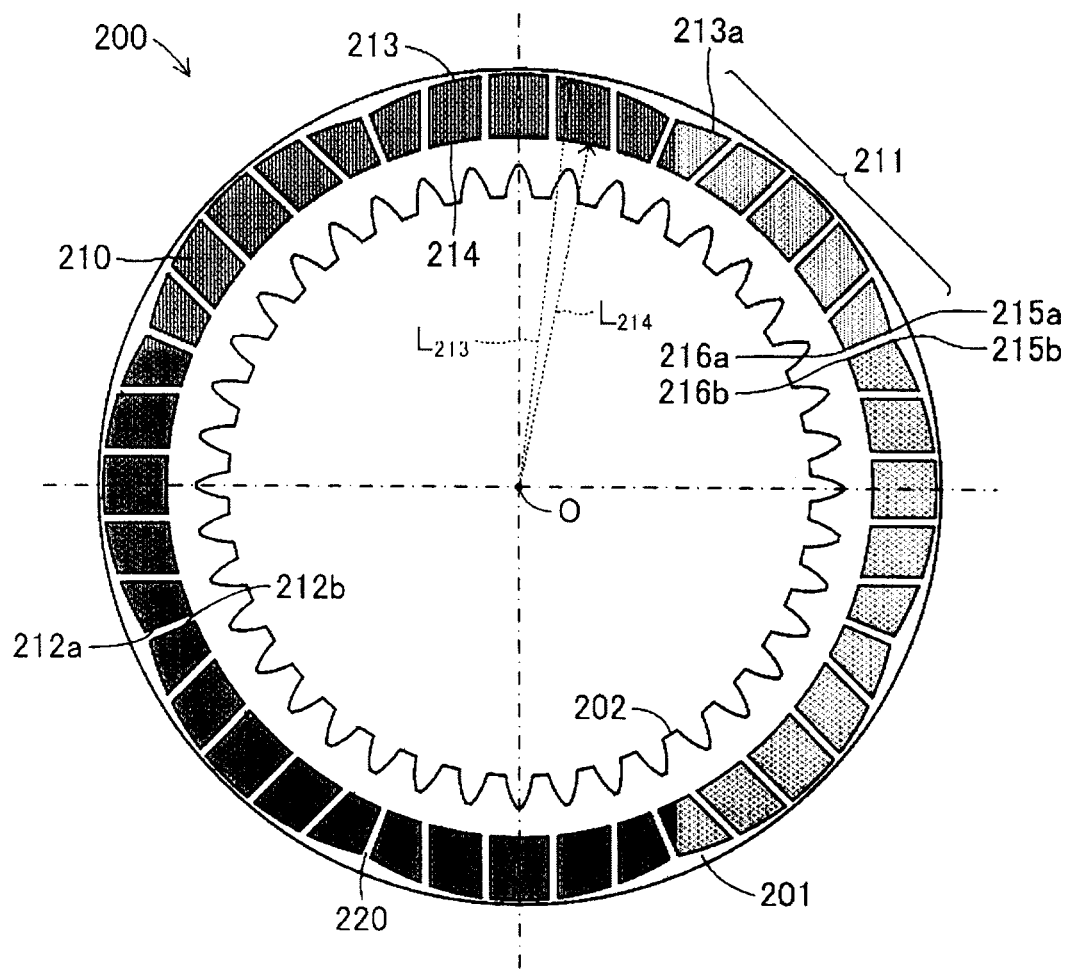
FIG. 4 is a plan view schematically showing the exterior of a clutch friction plate according to a modification of the embodiment of the present invention.
Figure 5:
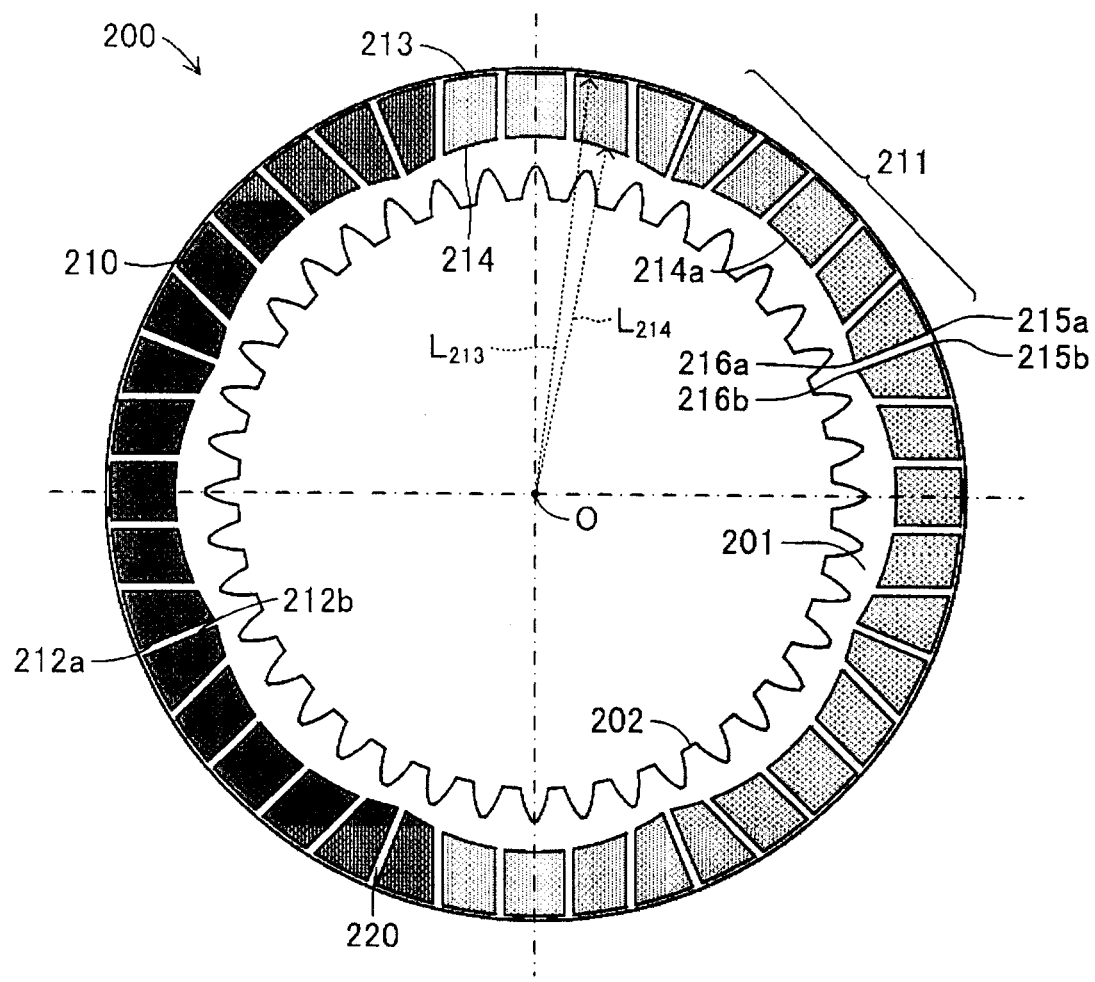
FIG. 5 is a plan view schematically showing the exterior of a clutch friction plate according to another modification of the embodiment of the present invention.

In the above-described embodiment, the continuously changing contours 213a and 214a are formed along the outer and inner peripheral edges 213 and 214 of each frictional sheet 210 of the clutch friction plate 200. However, it is sufficient that such a continuously changing contour 213a or 214a is formed along at least one of the outer and inner peripheral edges 213 and 214 of each frictional sheet 210. For example, as shown in FIG. 4, the continuously changing contour 213a may be formed along the outer peripheral edge 213 of each frictional sheet 210 only. Alternatively, as shown in FIG. 5, the continuously changing contour 214a may be formed along the inner peripheral edge 214 of each frictional sheet 210 only. In the case of the clutch friction plate 200 shown in FIG. 5, the continuously changing contour 214a formed along the inner peripheral edge 214 is formed by an arc whose curvature is greater than that of the continuously changing contour 214a shown in FIG. 2.

In the case of the clutch friction plate 200 of the above-described embodiment, the continuously changing contours 213a and 214a are formed along the outer and inner peripheral edges 213 and 214, respectively, of all the frictional sheets 210, i.e., over the entire circumference of the clutch friction plate 200. However, it is sufficient that the continuously changing contours 213a and 214a are formed over or along at least two of the frictional sheets 210 (namely, over a frictional-sheet group 211). Accordingly, the continuously changing contour 213a and/or the continuously changing contour 214a may be formed over two of the frictional sheets 210 provided along the circumferential direction of the metal core 201, the two frictional sheets 210 being located adjacent to each other at least one location (namely, over the frictional-sheet group 211).

Figure 6:
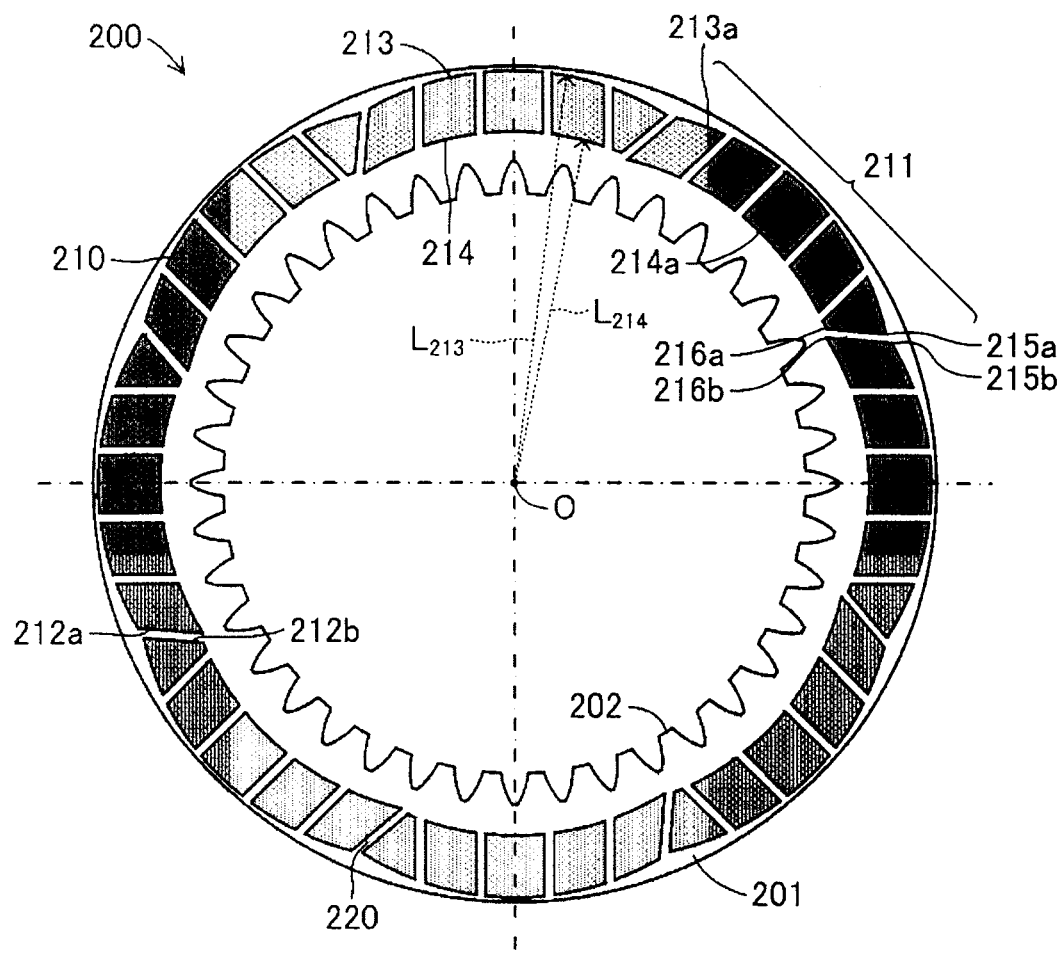
FIG. 6 is a plan view schematically showing the exterior of a clutch friction plate according to still another modification of the embodiment of the present invention.

In the above-described embodiment, mutually adjacent two end portions 215a and 215b of the outer peripheral edges 213 of two frictional sheets 210 which are contained in different frictional-sheet groups 211 and which are located adjacent to each other are the same in the terms of the distance $L_{213}$ from the center of rotation O of the metal core 201. Also, mutually adjacent two end portions 216a and 216b of the inner peripheral edges 214 of two frictional sheets 210 which are contained in different frictional-sheet groups 211 and which are located adjacent to each other are the same in the terms of the distance $L_{214}$ from the center of rotation O of the metal core 201. Namely, the two end portions 215a and 215b, which portions are located adjacent to each other at the boundary between the mutually adjacent frictional-sheet groups 211 on the side toward the outer peripheral edges 213, are the same in terms of the difference $L_{213}$ from the center of rotation O of the metal core 201. Similarly, the two end portions 216a and 216b, which portions are located adjacent to each other at the boundary between the mutually adjacent frictional-sheet groups 211 on the side toward the inner peripheral edges 214, are the same in terms of the difference $L_{214}$ from the center of rotation O of the metal core 201. However, as shown in FIG. 6, the two end portions 215a and 215b, which portions are located adjacent to each other at the boundary between the mutually adjacent frictional-sheet groups 211 on the side toward the outer peripheral edges 213, may be formed such that a positional difference in the radial direction of the metal core 201 is produced between the two end portions 215a and 215b. Thus, the two end portions 215a and 215b are made different from each other in terms of the difference $L_{213}$ from the center of rotation O of the metal core 201. Similarly, the two end portions 216a and 216b, which portions are located adjacent to each other at the boundary between the mutually adjacent frictional-sheet groups 211 on the side toward the inner peripheral edges 214, may be formed such that a positional difference in the radial direction of the metal core 201 is produced between the two end portions 216a and 216b. Thus, the two end portions 216a and 216b are made different from each other in terms of the difference $L_{214}$ from the center of rotation O of the metal core 201.

In this case, the outer and inner peripheral edge portions of the continuous annular oil film present between a clutch plate 103 and a clutch friction plate 200 adjacent thereto are disturbed by the end portions 215a, 215b, 216a, and 216b of mutually adjacent frictional-sheet groups 211, which end portions form steps between the frictional-sheet groups 211. As a result, it becomes more difficult for the clutch oil to maintain the continuous annular oil film, and the oil film decreases in thickness or breaks in some regions. Thus, drag torque can be decreased effectively. Notably, in this case, the positional difference in the radial direction of the metal core 201 may be provided selectively between the two end portions 215a and 215b which portions are located adjacent to each other at the boundary between the mutually adjacent frictional-sheet groups 211 on the side toward the outer peripheral edges 213, or between the two end portions 216a and 216b which portions are located adjacent to each other at the boundary between the mutually adjacent frictional-sheet groups 211 on the side toward the inner peripheral edges 214.

Figure 7:
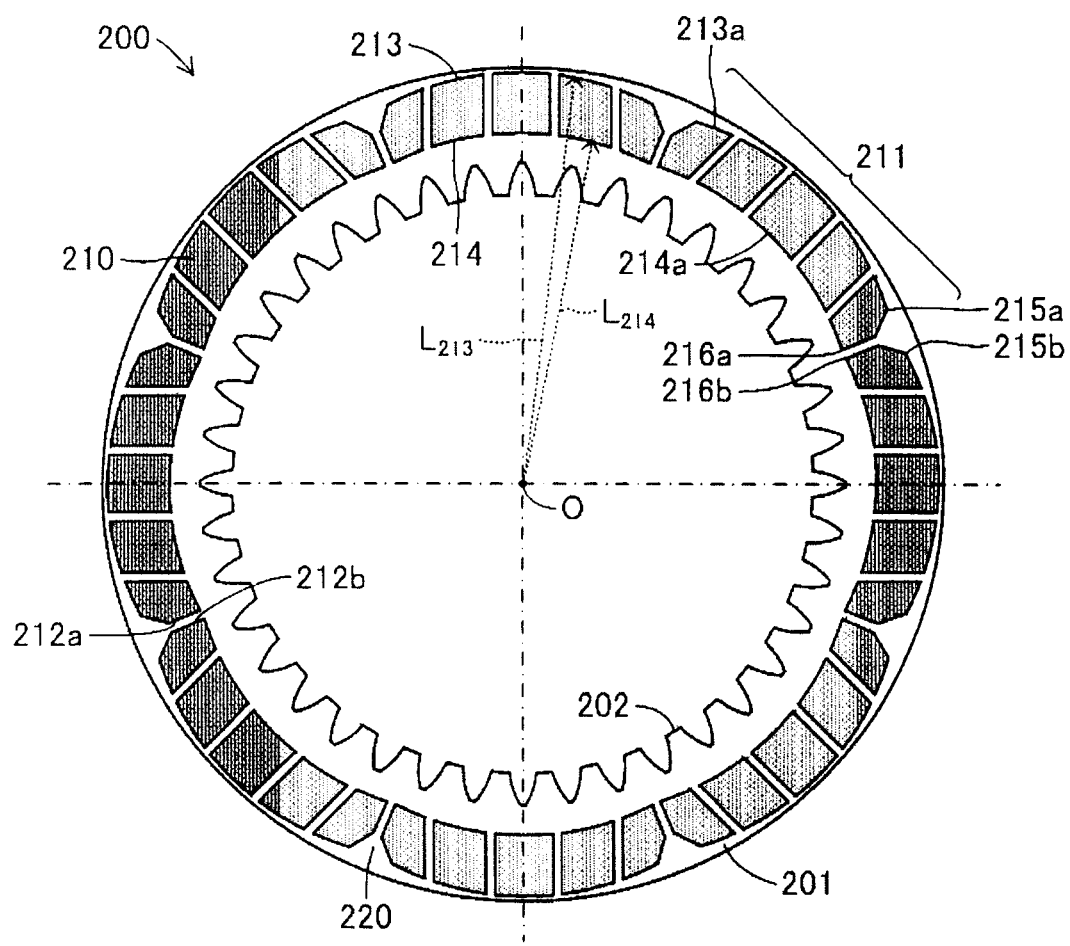
FIG. 7 is a plan view schematically showing the exterior of a clutch friction plate according to still another modification of the embodiment of the present invention.

In the above-described embodiment, the oil groove 220 formed by the gap between two frictional-sheet groups 211 located adjacent to each other has a fixed width. However, the oil groove 220 may be formed to have a generally triangular shape by forming two edge portions 212a and 212b of the frictional sheets 210, which portions face each other at the boundary between the mutually adjacent frictional-sheet groups 211, such that the distance between the two edge portions 212a and 212b decreases or increases from the inner periphery side toward the outer periphery side of the metal core 201. For example, as shown in FIG. 7, the oil groove 220 may be formed to have a generally triangular shape by forming the two edge portions 212a and 212b of the frictional sheets 210, which portions face each other at the boundary between the mutually adjacent frictional-sheet groups 211, such that the distance between the two edge portions 212a and 212b increases from the inner periphery side toward the outer periphery side of the metal core 201. In this case, since the clutch oil present between a clutch plate 103 and a clutch friction plate 200 adjacent thereto flows more easily from the inner side toward the outer side of the clutch friction plate 200, drag torque can be reduced more effectively.

Figure 8:
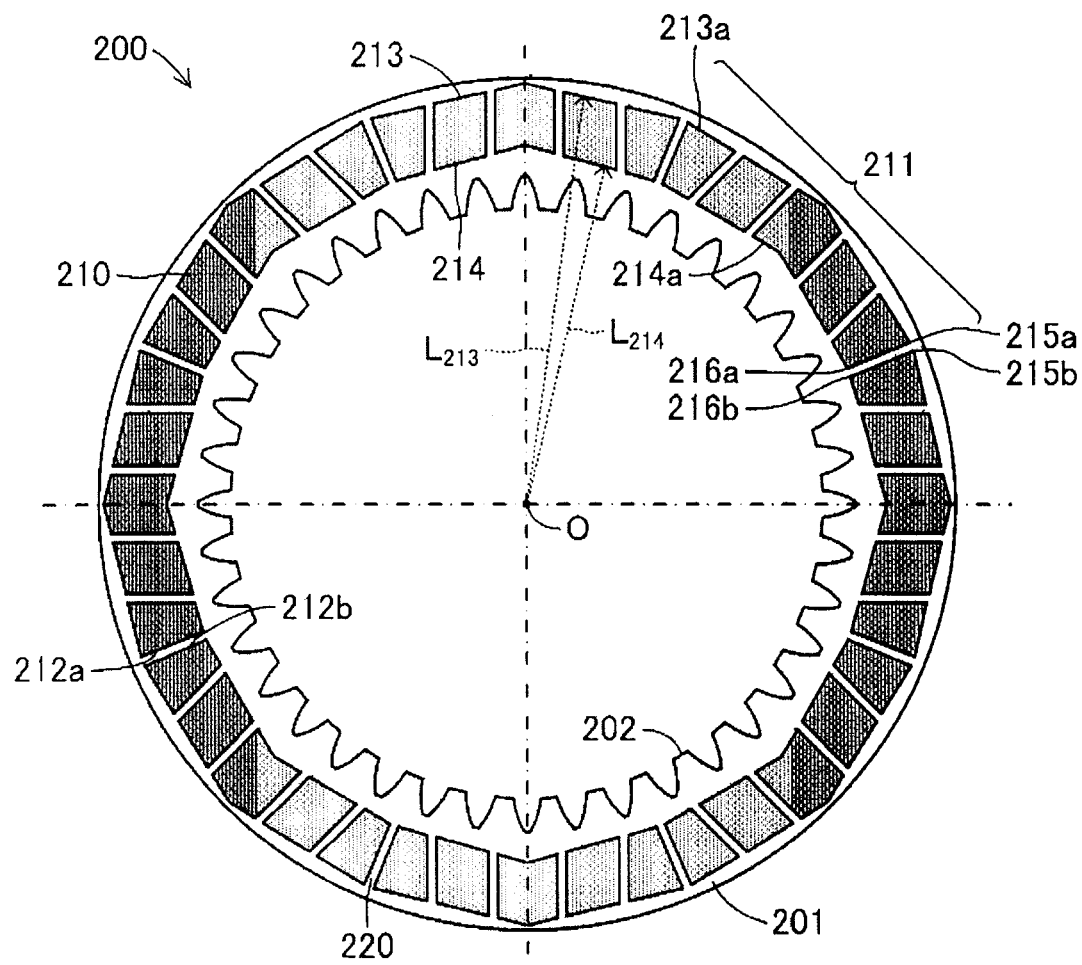
FIG. 8 is a plan view schematically showing the exterior of a clutch friction plate according to still another modification of the embodiment of the present invention.

In the case of the clutch friction plate 200 of the above-described embodiment, continuously changing arcuate contours 213a and 214a are formed along the outer and inner peripheral edges 213 and 214 of each frictional sheet 210 of the clutch friction plate 200. In this case, the continuously changing contours 213a and 214a are formed by arcs which have the same radius. However, the continuously changing contours 213a and 214a are not limited to those of the above-described embodiment, so long as the continuously changing contours are determined such that the distance from the center of rotation O of the metal core 201 changes continuously over a region corresponding to a single frictional-sheet group 211. Namely, each of the continuously changing contours 213a and 214a may be formed by using an arc, a curve, or a straight line solely or by properly combining them. In this case, the continuously changing contour 213a and the continuously changing contour 214a may have different shapes. For example, the continuously changing contour 213a formed along the outer peripheral edges 213 of the frictional sheets 200 and the continuously changing contour 214a formed along the inner peripheral edges 214 thereof may be formed by arcs which have different radius and centers. Alternatively, as shown in FIG. 8, each of the continuously changing contours 213a and 214a may be formed by straight lines.

In the above-described embodiment, each frictional-sheet group 211 is formed by five frictional sheets 210 which are successively arranged. However, it is sufficient that each frictional-sheet group 211 is formed by at least two frictional sheets 210 located adjacent to each other. For example, each frictional-sheet group 211 may be formed by two, three, four, six, or more frictional sheets 210. Also, each single clutch friction plate 200 may include a plurality of types of frictional-sheet groups 211 which differ from one another in the number of the frictional sheets 210.

In the above-described embodiment, the wet friction plate of the present invention is applied to the clutch friction plate 200 used in the friction clutch 100. However, the wet friction plate of the present invention can be applied to other friction plates which are used in oil. Specifically, the wet friction plate of the present invention can be applied to a friction plate used in a brake which brakes a rotational motion produced by a prime mover.

DESCRIPTION OF SYMBOLS

O . . . center of rotation; $L_{213}$, $L_{214}$, $L_{94}$, $L_{95}$ . . . distance from center of rotation O;
90 . . . clutch friction plate; 91 . . . metal core; 92 . . . frictional sheet; 93 . . . oil groove; 94 . . . outer peripheral edge; 95 . . . inner peripheral edge;
100 . . . friction clutch; 101 . . . housing; 102 . . . input gear; 103 . . . clutch plate; 104 . . . friction plate holder; 105 . . . shaft; 106 . . . push rod; 107 . . . press cover;
200 . . . clutch friction plate; 201 . . . metal core; 202 . . . spline;
210 . . . frictional sheet; 211 . . . frictional-sheet group; 212$a$, 212$b$ . . . edge portion; 213 . . . outer peripheral edge; 213$a$ . . . continuously changing contour; 214 . . . inner peripheral edge; 214$a$ . . . continuously changing contour; 215$a$, 215$b$, 216$a$, 216$b$ . . . end portion.

The invention claimed is:

1. A wet friction plate comprising:
a flat annular metal core having a center of rotation; and
a plurality of friction sheet groups which are disposed on a surface of the metal core and extend in a circumferential direction of the metal core,
each friction sheet group comprising three frictional sheets consecutively arranged in the circumferential direction of the metal core and each separated from an adjacent frictional sheet by a gap forming an oil groove,
each friction sheet group having on at least one of its inner periphery and its outer periphery a continuously changing contour which extends over all the frictional sheets in the friction sheet group and which coincides with a single continuous curve which is concave towards the center of rotation of the metal core over the length of the curve, the distance from the curve to the center of rotation of the core continuously changing over the length of the curve.

2. A wet friction plate as claimed in claim 1 wherein:
each friction sheet group is disposed adjacent to another of the friction sheet groups in the circumferential direction of the metal core and is separated from the adjacent friction sheet group by an oil groove;
each friction sheet group has an end surface which is disposed at a circumferential end of the friction sheet group and opposes the end surface of the adjacent friction sheet group; and
each end surface is radially offset from the opposing end surface of the adjacent friction sheet group along at least one of the inner and outer peripheral edges of the two adjacent friction sheet groups as measured from the center of rotation of the metal core.

3. A wet friction plate as claimed in claim 2 wherein each end surface is radially offset from the opposing end surface of the adjacent friction sheet group along the inner peripheral edges of the two adjacent friction sheet groups as measured from the center of rotation of the metal core.

4. A wet friction plate as claimed in claim 2 wherein each end surface is radially offset from the opposing end surface of the adjacent friction sheet group along the outer peripheral edges of the two adjacent friction sheet groups as measured from the center of rotation of the metal core.

5. A wet friction plate as claimed in claim 1 wherein each friction sheet group has a contour along its inner periphery which coincides with a first circular arc having a center of curvature which is spaced from the center of rotation of the metal core and lies on a line passing through the center of rotation of the metal core, and a contour along its outer periphery which coincides with a second circular arc having a center of curvature which is spaced from the center of rotation of the metal core and lies on the same line as the center of curvature of the first circular arc.

6. A wet friction plate as claimed in claim 5 wherein the line passes through the friction sheet group.

7. A wet friction plate as claimed in claim 6 wherein the friction sheet group is symmetrical with respect to the line.

8. A wet friction plate as claimed in claim 1 wherein:
each friction sheet group is disposed adjacent to another of the friction sheet groups in the circumferential direction of the metal core and is separated from the adjacent friction sheet group by an oil groove;
each friction sheet group includes first and second end surfaces disposed at first and second circumferential ends of the friction sheet group;
each end surface opposes one of the end surfaces of an adjacent one of the friction sheet groups; and
each end surface is radially offset from the opposing end surface of the adjacent friction sheet group along at least one of the inner and outer peripheral edges of the two adjacent friction sheet groups as measured from the center of rotation of the metal core.

9. A wet friction plate as claimed in claim 8 wherein each end surface is radially offset from the opposing end surface of the adjacent friction sheet group along the inner peripheral edges of the two adjacent friction sheet groups as measured from the center of rotation of the metal core.

10. A wet friction plate as claimed in claim 8 wherein each end surface is radially offset from the opposing end surface of the adjacent friction sheet group along the outer peripheral edges of the two adjacent friction sheet groups as measured from the center of rotation of the metal core.

11. A wet friction plate as claimed in claim 1 wherein each of the frictional sheets has four unrounded corners.

12. A wet friction plate as claimed in claim 11 wherein each of the frictional sheets is a quadrilateral.

13. A wet friction plate as claimed in claim 1 wherein each friction sheet group is symmetric with respect to a line of symmetry passing from the center of rotation of the metal core through the friction sheet group.

14. A wet friction plate as claimed in claim 13 wherein the line of symmetry passes through one of the frictional sheets in the friction sheet group.

15. A wet friction plate as claimed in claim 1 wherein each friction sheet group has a continuously changing contour on both its inner periphery and its outer periphery.

16. A wet friction plate as claimed in claim 1 wherein two of the friction sheet groups are disposed adjacent to each other in the circumferential direction of the metal core on opposite sides of a generally triangular oil groove.

17. A wet friction plate as claimed in claim 1 wherein each friction sheet group includes a first frictional sheet which has first and second sides which are parallel to each other and which is symmetric with respect to a radius of the metal core passing through the first frictional sheet, and second and third frictional sheets which are disposed on opposite sides of the first frictional sheet and which each have a different shape from the first frictional sheet.

* * * * *